United States Patent
Porat

(10) Patent No.: US 8,170,601 B2
(45) Date of Patent: May 1, 2012

(54) SIGNAL TRANSMISSION PARAMETER CONTROL USING CHANNEL SOUNDING

(75) Inventor: Ron Porat, San Diego, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 0 days.

(21) Appl. No.: 13/272,678

(22) Filed: Oct. 13, 2011

(65) Prior Publication Data

US 2012/0034949 A1 Feb. 9, 2012

Related U.S. Application Data

(62) Division of application No. 12/169,537, filed on Jul. 8, 2008, now Pat. No. 8,046,022.

(51) Int. Cl.
*H04B 1/00* (2006.01)
*H04B 17/00* (2006.01)
*H04B 7/00* (2006.01)
*H04B 1/04* (2006.01)

(52) U.S. Cl. .... 455/522; 455/69; 455/127.1; 455/67.13; 455/63.1

(58) Field of Classification Search ............ 455/69, 455/522, 127.1, 63.1, 67.13, 226.1
See application file for complete search history.

(56) References Cited

U.S. PATENT DOCUMENTS

| | | | |
|---|---|---|---|
| 7,660,599 B2 * | 2/2010 | Azuma | 455/522 |
| 7,986,959 B2 * | 7/2011 | Malladi et al. | 455/522 |
| 8,023,901 B2 * | 9/2011 | Lee | 455/67.13 |
| 2008/0045260 A1 * | 2/2008 | Muharemovic et al. | 455/522 |
| 2008/0207245 A1 * | 8/2008 | Wakabayashi et al. | 455/522 |
| 2008/0233992 A1 * | 9/2008 | Oteri et al. | 455/522 |
| 2008/0280638 A1 * | 11/2008 | Malladi et al. | 455/522 |

* cited by examiner

*Primary Examiner* — Tilahun B Gesesse
(74) *Attorney, Agent, or Firm* — Volpe and Koenig, P.C.

(57) ABSTRACT

A base station (BTS) may instruct a client station (CS) to transmit sounding signals that the BTS may analyze to determine what adjustments, such as power, time, and/or frequency adjustment(s) should be made by the CS. The BTS may control when and how the sounding signals are sent by the CS. This helps reduce the possibility of adjustment signals transmitted by two or more CSs colliding. Thus, sounding signals transmitted by the CS in response to a request by the BTS can be received by the BTS with higher a probability of success. This permits the BTS to more accurately characterize the channel and to provide better adjustment of power level, frequency offset, and/or timing offset for more optimal communication. Such techniques can be used to reduce bit error rates and to improve the overall signal to noise ratio encountered by the system.

13 Claims, 13 Drawing Sheets

SIGNAL TRANSMISSION PARAMETER CONTROL USING CHANNEL SOUNDING

CROSS REFERENCE TO RELATED APPLICATIONS

This application is a divisional of U.S. patent application Ser. No. 12/169,537, filed Jul. 8, 2008, the contents of which are hereby incorporated by reference herein.

BACKGROUND

1. Field of the Invention

This disclosure generally relates to electronics. In particular, the disclosure relates to wireless communications.

2. Description of the Related Art

Wireless devices are ubiquitous. One increasingly popular wireless standard is the IEEE 802.16 standard known as WiMAX. Typically, relatively many client stations (CSes), also known as mobile stations, share access to a base station (BTS).

In a conventional base station (BTS), the power level, frequency offset, and timing offset (PFT) is at least partially under some form of adaptive control. For example, there exist power control loops to control output power to or from the client station (CS) and the base station (BTS). However, when many client stations (CSes) are simultaneously communicating with a base station (BTS), the transmission from one client station (CS) can interfere with the transmission from another client station (CS). This can cause the base station (BTS) to inaccurately assess the transmission characteristics and adjust the PFT in a suboptimal manner.

SUMMARY OF THE DISCLOSURE

One embodiment is a method for correcting transmission parameters, the method including: wirelessly communicating with a client station; transmitting to the client station a sounding command to the client station to instruct the client station to transmit a sounding signal; receiving in an uplink the sounding signal from the client station; determining channel characteristics based at least partly on the sounding signal; determining one or more signal transmission correction parameters for at least one of timing adjustment, power adjustment, or frequency adjustment based at least partly on the determined channel characteristics; and transmitting in a downlink to the client station a message including the one or more correction parameters.

One embodiment is an apparatus including: a transmitter configured to process signals for a downlink to a client station over a wireless transmission medium; a receiver configured to receive at least a sounding signal from an uplink from the client station over the wireless transmission medium; and a control circuit in communication with the transmitter and the receiver, wherein the control circuit is configured: to cause the transmitter to request in a downlink the client station to transmit the sounding signal over a wireless transmission medium; to determine channel characteristics associated with the sounding signal; to determine one or more signal transmission correction parameters for at least one of timing adjustment, power adjustment, or frequency adjustment based at least partly on the determined channel characteristics; and to cause the transmitter to transmit in a downlink a ranging response message including the one or more correction parameters.

One embodiment is an apparatus for correcting transmission parameters, the apparatus including: means for wirelessly communicating with a client station; means for requesting the client station to transmit a sounding signal; means for receiving in an uplink the sounding signal from the client station; means for determining channel characteristics based at least partly on the sounding signal; means for determining one or more signal transmission correction parameters for at least one of timing adjustment, power adjustment, or frequency adjustment based at least partly on the determined channel characteristics; and means for transmitting in a downlink a ranging response message including the one or more correction parameters.

One embodiment is a computer readable medium which stores a computer program that embodies a method of correcting transmission parameters, the method including: wirelessly communicating with a client station; requesting the client station to transmit a sounding signal; receiving in an uplink the sounding signal from the client station; determining channel characteristics based at least partly on the sounding signal; determining one or more signal transmission correction parameters for at least one of timing adjustment, power adjustment, or frequency adjustment based at least partly on the determined channel characteristics; and transmitting in a downlink a ranging response message including the one or more correction parameters.

One embodiment is a method for determining range, the method including: wirelessly requesting one or more client stations to transmit a ranging signal; receiving, in a multiple-element antenna array, one or more ranging signals from the one or more client stations; storing samples of the one or more ranging signals; analyzing the stored samples of the one or more ranging signals using a plurality of possible antenna patterns; and selecting a particular antenna pattern for determining range to a particular client station.

BRIEF DESCRIPTION OF THE DRAWINGS

These drawings and the associated description herein are provided to illustrate specific embodiments of the disclosure and are not intended to be limiting.

DETAILED DESCRIPTION OF SPECIFIC EMBODIMENTS

Although particular embodiments are described herein, other embodiments of the disclosure, including embodiments that do not provide all of the benefits and features set forth herein, will be apparent to those of ordinary skill in the art.

Figure 1:
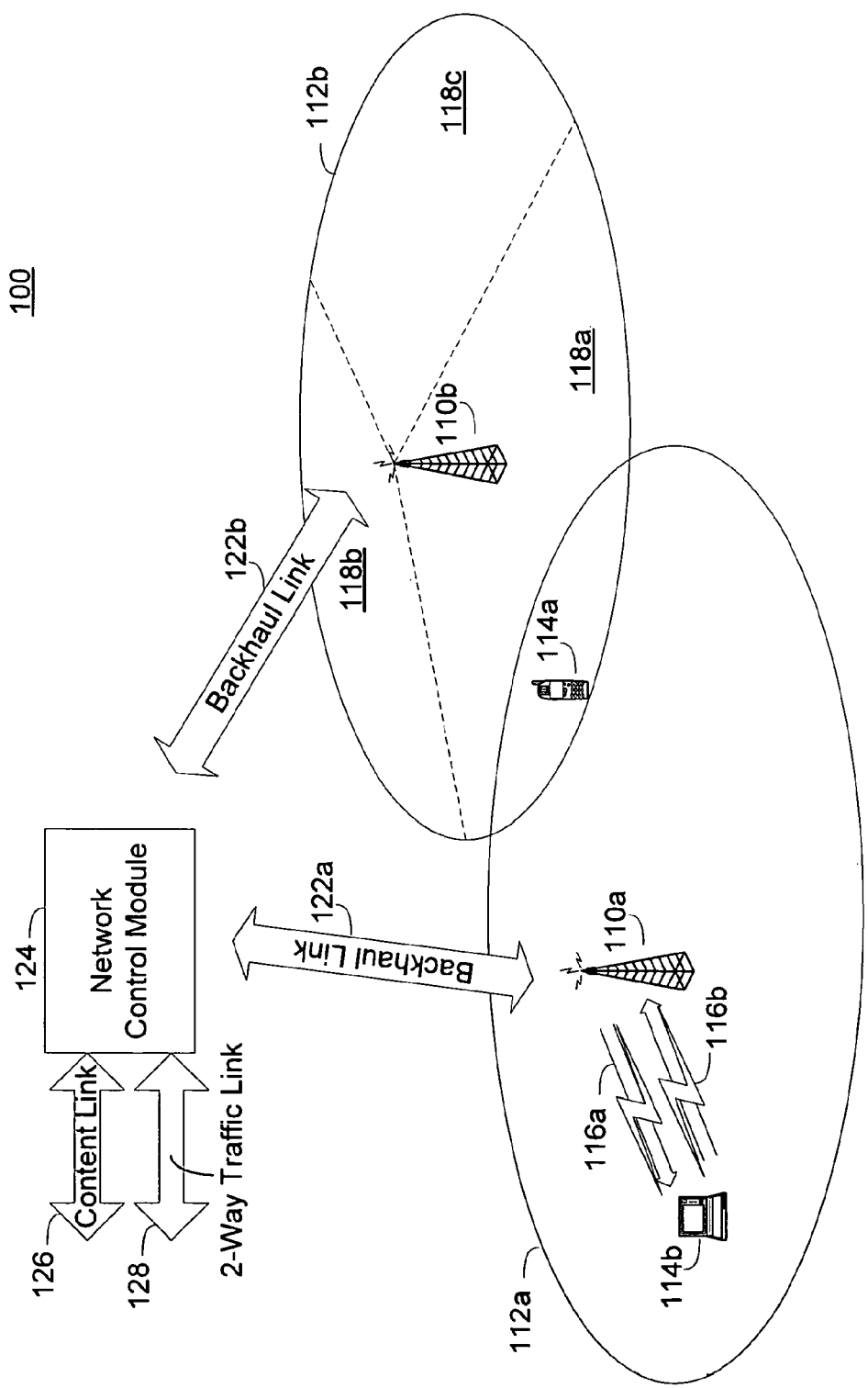
FIG. 1 is a simplified functional block diagram of an embodiment of a wireless communication system.

FIG. 1 is a simplified functional block diagram of an embodiment of a wireless communication system 100. The wireless communication system 100 includes a plurality of base stations 110a and 110b, each supporting a corresponding service or coverage area 112a and 112b. The base stations are capable of communicating with wireless devices within their coverage areas. For example, the first base station 110a is capable of wirelessly communicating with a first client station 114a and a second client station 114b within the coverage area 112a. The first client station 114a is also within the coverage area 112b and is capable of communicating with the second base station 110b. In this description, the communication path from the base station to the client station is referred to as a downlink 116a and the communication path from the client station to the base station is referred to as an uplink 116b.

Although for simplicity only two base stations are shown in FIG. 1, a typical wireless communication system 100 includes a much larger number of base stations. The base stations 110a and 110b can be configured as cellular base station transceiver subsystems, gateways, access points, radio frequency (RF) repeaters, frame repeaters, nodes or any wireless network entry point.

The base stations 110a and 110b can be configured to support an omni-directional coverage area or a sectored coverage area. For example, the second base station 110b is depicted as supporting the sectored coverage area 112b. The coverage area 112b is depicted as having three sectors, 118a, 118b, and 118c. In typical embodiments, the second base station 110b treats each sector 118 as effectively a distinct coverage area.

Although only two client stations 114a and 114b are shown in the wireless communication system 100, typical systems are configured to support a large number of client stations. The client stations 114a and 114b can be mobile, nomadic or stationary units. The client stations 114a and 114b are often referred to as, for example, mobile stations, mobile units, subscriber stations, wireless terminals or the like. A client station can be, for example, a wireless handheld device, a vehicle mounted device, a portable device, client premise equipment, a fixed location device, a wireless plug-in accessory or the like. In some cases, a client station can take the form of a handheld computer, notebook computer, wireless telephone, personal digital assistant, wireless email device, personal media player, meter reading equipment or the like in may include a display mechanism, microphone, speaker and memory.

In a typical system, the base stations 110a and 110b also communicate with each other and a network control module 124 over backhaul links 122a and 122b. The backhaul links 122a and 122b may include wired and wireless communication links. The network control module 124 provides network administration and coordination as well as other overhead, coupling and supervisory functions for the wireless communication system 100.

In some embodiments, the wireless communication system 100 can be configured to support both bidirectional communication and unidirectional communication. In a bidirectional network, the client station is capable of both receiving information from and providing information to the wireless communications network. Applications operating over the bidirectional communications channel include traditional voice and data applications. In a unidirectional network, the client station is capable of receiving information from the wireless communications network but may have limited or no ability to provide information to the network. Applications operating over the unidirectional communications channel include broadcast and multicast applications. In one embodiment, the wireless communication system 100 supports both bidirectional and unidirectional communications. In such an embodiment, the network control module 124 is also coupled to external entities via, for example, content link 126 and two-way traffic link 128.

In one example, the wireless communication system 100 is configured to use Orthogonal Frequency Division Multiple Access (OFDMA) communication techniques. For example, the wireless communication system 100 can be configured to substantially comply with a standard system specification, such as IEEE 802.16 and its progeny or some other wireless standard such as, for example, WiBro, WiFi, Long Term Evolution (LTE) or it may be a proprietary system. The ideas described herein are not limited to application to OFDMA systems. The description in the context of an OFDMA system is offered for the purposes of providing a particular example only.

In a conventional wireless communication system, a base station and a client station use channel sounding for beamforming. The client station can also be referred to as a mobile station (MS). When channel sounding occurs in a conventional 802.16 system, the base station instructs the client station to transmit a particular waveform. The waveform is then transmitted by the MS and received by the base station where it is analyzed for signature, such as direction of arrival (DOA). Such analysis can be used to calculate beamforming vectors for receiving signals from and transmitting signals to the client station.

Beamforming controls the directionality (antenna pattern) of a base station antenna array. This permits, for example, the main lobe (beam) of the antenna to be directed to the client station for relatively good gain, while reducing interference from signal sources emanating from other directions. For example, beamforming can be accomplished by phase shifting antenna elements of a base station (BTS) antenna array. Beamforming is described in, for example, section 8.4.6.2.7 of Part 16: Air Interface For Broadband Wireless Access Systems, P802.16Rev2/D4, Institute of Electrical and Electronics Engineers, April 2008 (hereinafter referred to as the "IEEE 802.16 standard." While illustrated in the context of the IEEE 802.16 standard, the principles and advantages described herein are applicable to other types of wireless communication standards.

One feature of channel sounding is that a client station (CS) transmits channel sounding signals (also known as sounding waveforms) on an uplink in response to sounding command from the base station (BTS), for example, in response to an UL_Sounding_Command IE( ) instruction. Since the sounding by the client station (CS) is under the control of the base station (BTS), the BTS can schedule channel sounding signals to be sent by the client station (CS) to avoid collisions with other signals, such as channel sounding signals from other client stations. This absence of collisions can permit the analysis of the sounding signals to be more accurate than analysis of random access channels from a client station (CS). In an embodiment of the disclosure, the base station (BTS) analyzes a sounding transmission to make power level, frequency offset, and/or timing offset adjustments. By contrast, a conventional base station only adjusts the phasing of an antenna array, that is, performs beamforming, in response to analysis of a channel sounding signal. In one embodiment, a base station (BTS) is configured to either beamform or to make power level, frequency offset, and/or timing offset (PFT) adjustments, but not both beamform and make PFT adjustments based on the same sounding signal.

Figure 2:
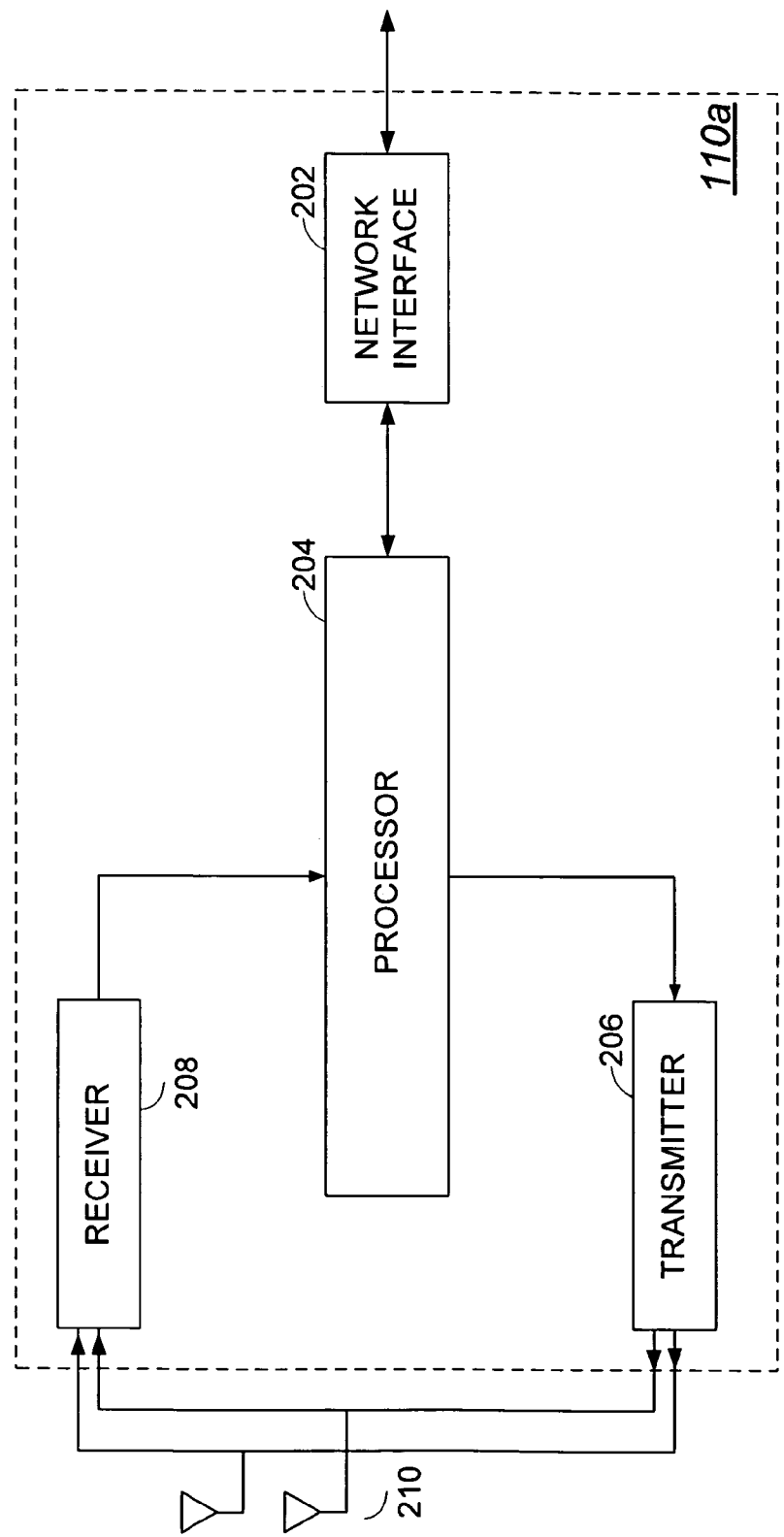
FIG. 2 is a block diagram of an embodiment of a base station (BTS).

FIG. 2 is a block diagram of an embodiment of a base station (BTS) 110a. The base station 110a can include, for example, a network interface 202, a processor 204, a transmitter 206, a receiver 208, and an antenna 210. The network interface 202 permits the base station 112 to communicate with, for example, wired data lines, such as a local area network (LAN), wide area network (WAN), telephone network, etc.

The processor 204 can bridge between the network interface 202 and a client station (CS) via the transmitter 206 and the receiver 208. The processor 204 can initiate a channel sounding instruction, can perform channel analysis, can perform beamforming, and the like. The processor 204 can be implemented by hardware, by software/firmware, or by a combination of both hardware and software/firmware. One process that can be performed by the processor 204 will be described in greater detail later in connection with FIG. 4.

The transmitter 206 receives data from the processor 204 for control and for transmission via the antenna 210. The transmitter 206 can provide functions such as multiplexing, modulation, upconversion, power amplification, and the like.

The receiver 208 receives transmitted signals, such as the channel sounding signals, from various client stations. The receiver 208 can provide functions such as demodulation, downconversion, and the like.

Figure 3:
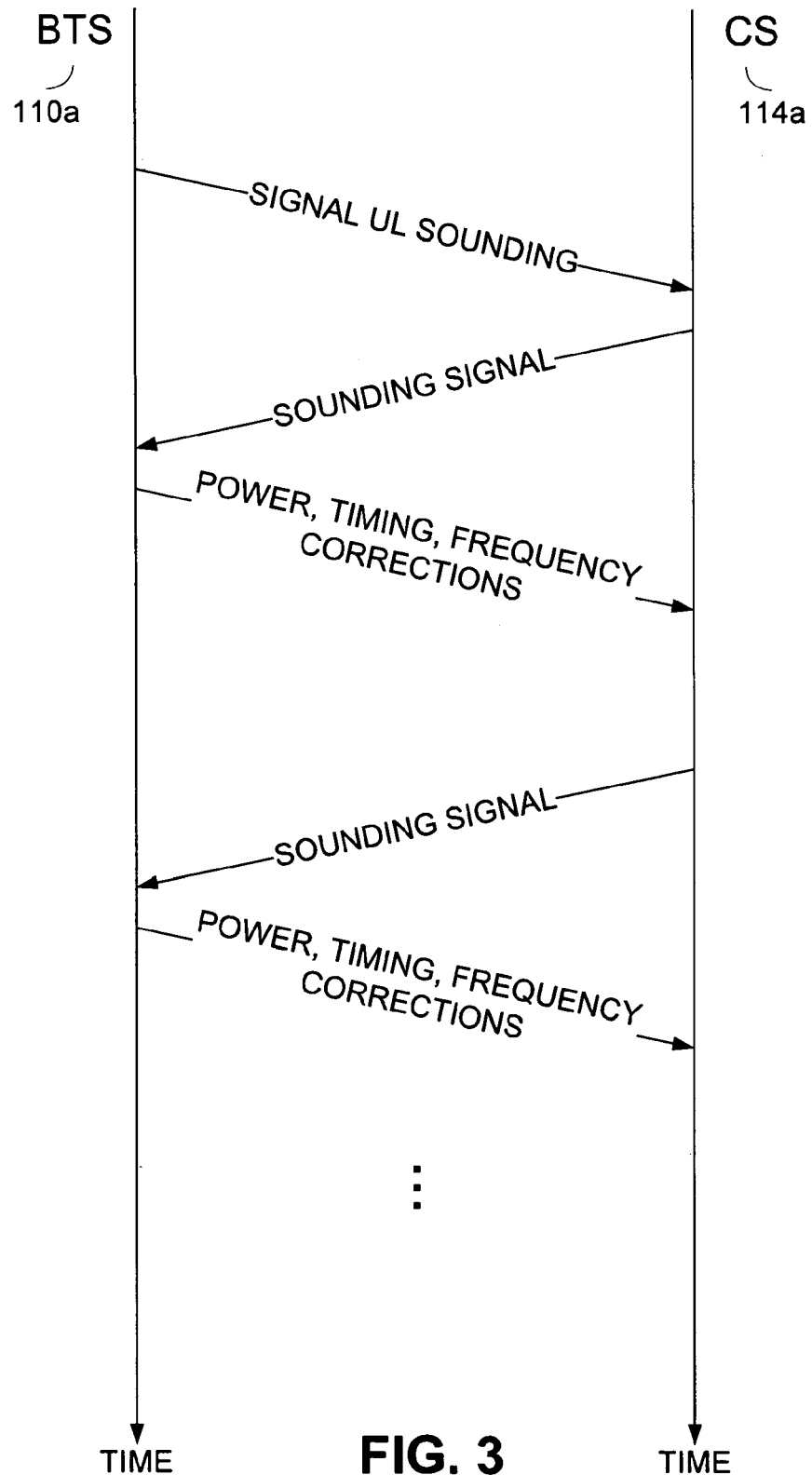
FIG. 3 illustrates a diagram showing interaction between a base station (BTS) and a client station (CS).

FIG. 3 illustrates a diagram showing interaction between a base station (BTS) 110a and a client station (CS) 114a. The two axis correspond to time, with time increasing towards the bottom.

The base station 110a signals the client station for uplink sounding. For example, in the context of IEEE 802.16, the base station 110a transmits the UL_Sounding_Command IE( ) information element. The base station 110a allocates a UL sounding zone within a frame for the sounding signal by, for example, in the context of IEEE 802.16, sending a PAPR Reduction/Sounding Zone/Safety Zone Allocation information element to define a sounding zone. See, for example, section 8.4.5.4.2 of the IEEE 802.16 standard. Preferably, all client stations 114a within the range of the base station 110a receive the sounding zone allocation information element.

The applicable client station (CS) 114a transmits the channel sounding signal in an uplink at the time as indicated by the sounding instruction. Due to the sounding zone allocation and corresponding absence of transmissions from other client stations, the base station (BTS) 110a can receive the sounding signal with relatively little interference.

The base station (BTS) 110a analyzes the sounding signal and generates one or more signal transmission correction parameters for the client station (CS) 114a, such as one or more of power level, frequency offset, and/or timing offset correction parameters. In the context of an IEEE 802.16 compliant system, the base station (BTS) 110a can communicate these corrections in, for example, a ranging response message (RNG-RSP) as described in section 6.3.2.3.6 of the IEEE 802.16 standard. The process can then repeat as desired.

Figure 4:
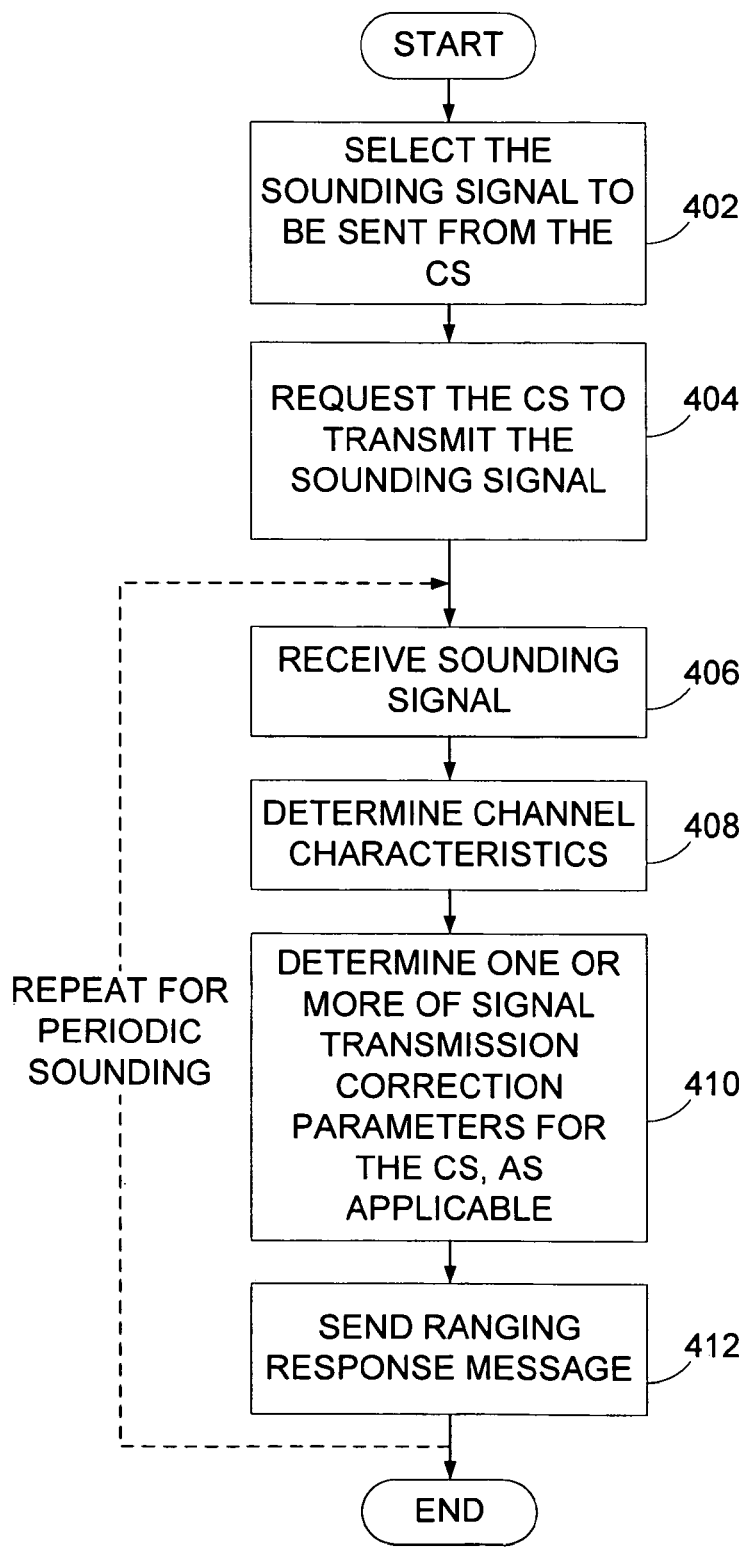
FIG. 4 is a flowchart generally illustrating a process for adjustment of power level, frequency offset, and/or timing offset using channel sounding.

FIG. 4 is a flowchart generally illustrating a process for adjustment of power level, frequency offset, and/or timing offset using channel sounding. The process operates in a base station (BTS). The illustrated process can be embodied in hardware, in software or firmware, or in a combination of both hardware and software/firmware. It will be appreciated by the skilled practitioner that the illustrated process can be modified in a variety of ways without departing from the spirit and scope of the disclosure. For example, in another embodiment, various portions of the illustrated process can be combined, can be rearranged in an alternate sequence, can be removed, and the like.

The process begins by the BTS selecting 402 the sounding signal or a particular waveform to be sent from the client station (CS). As noted above, this sounding signal may be, for example, a sounding message that is also useable by the BTS for beamforming. For example, in an embodiment, the sounding signal may be a sounding signal in accordance with section 8.4.6.2.7 of the IEEE 802.16 standard. Further, the BTS may select the particulars of the sounding message to be used by, for example, receiving a message from a network control module specifying the sounding message to be used. Or, for example, the specifics of the sounding message may be stored by the BTS during, for example, provisioning of the BTS and then specifics retrieved by the BTS when needed. A more detailed description of an exemplary sounding signal is provided below.

The BTS then may request 404 the client station (CS) 114a to transmit the sounding signal. This request may be, for example, a request also useable by the BTS for instructing the CS to transmit a sounding message for use by the BTS in performing beamforming adjustments. For example, in an embodiment, this request may be in the form of an UL Sounding Command Information Element (IE), such as, for example, specified in section 8.4.6.2.7.1 of the IEEE 802.16 standard. A further description of an exemplary request is provided below. In addition, the process may also allocate a sounding zone such that the sounding signal is sent via the uplink without collisions.

The Process then advances to the BTS receiving 406 the sounding signal from the applicable client station (CS) 114a to which the request was transmitted. The process then advances to the BTS determining 408 the channel characteristics from analysis of the sounding signal. For example, power level, frequency offset, and timing offset can be analyzed for one or more symbols of the sounding signal. A further explanation of an exemplary mechanism for determining adjustments is provided below.

The process then advances to the BTS determining 410 appropriate corrections for the client station (CS) for one or more of power level, frequency offset, or timing offset. The process then advances to the BTS sending 412 the correction(s) to the client station via, for example, a ranging response message. This ranging response message may be for example, a ranging response message (RNG-RSP) such as described in section 6.3.2.3.6 of the IEEE 802.16 standard. The process can end or return to receive 406 other sounding signals. For example, in one embodiment, the process can instruct the client station (CS) 114a to repeatedly send the sounding signals within allocated sounding zones. For example, the process can transmit an indicator specifying the number of times that the sounding signal is to be repeated as well as its periodicity (i.e., when the sounding signal is to be repeated). Or, for example, the indicator may instruct the client station (CS) 114a to keep transmitting the sounding signals with, for example, a given periodicity, or the like. The process should allocate further sounding zones as needed for subsequent sounding signals.

Figure 5:
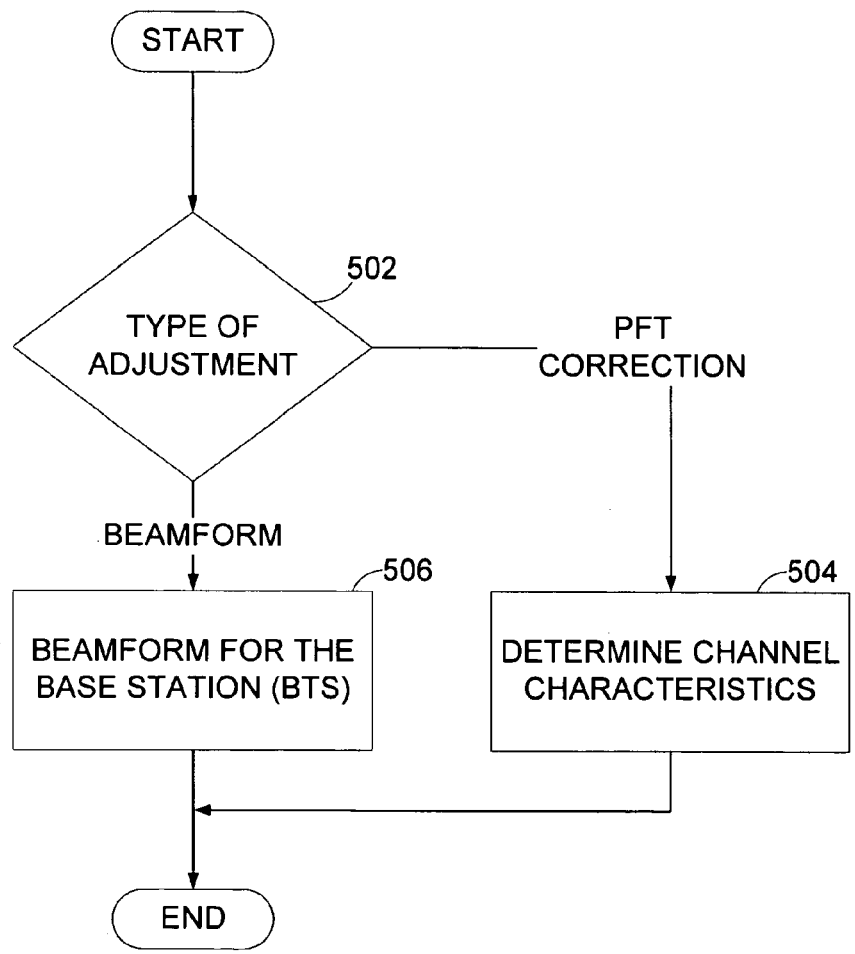
FIG. 5 is a flowchart generally illustrating a process for determining whether to perform beamforming or determine channel characteristics.

FIG. 5 is a flowchart generally illustrating a process for determining whether to perform beamforming or determine channel characteristics. The process can be implemented in the base station (BTS) 110a. As described earlier in connection with FIG. 4, the process can request a sounding signal from a client station (CS) for the purposes of power level, frequency offset, and/or timing offset (PFT) correction. The sounding signal can also be requested for the purposes of beamforming.

The process begins by determining 502 the type of adjustment to be made from the sounding signal is being sent by the client station (CS). In one embodiment, the particular sounding waveform selected by the base station (BTS) 110a is optimized for either PFT correction or for beamforming. If the sounding waveform was requested for PFT correction, the process proceeds to determine 504 the channel characteristics from the sounding waveform. On the other hand, if the sounding signal was requested for beamforming, the process proceeds to beamform 506, such as adjust phase of an antenna array, using the received sounding signal. In one embodiment, the process performs only one of determining 504 channel characteristics or beamforming 506 from the sounding signal, and not both at the same time. The client station (CS) need not be aware whether the base station (BTS) is performing beamforming or performing power level, frequency offset, and/or timing offset adjustments with the channel sounding.

The following table provides an exemplary message format that may be used by a BTS in transmitting a request to a CS to generate a sounding message.

TABLE 1

| Field | Notes |
| --- | --- |
| Identification Code | A code number that identifies this message as a sounding signal request message |
| Length | Identifies the length of this message |
| Sounding Type | Identifies the type of sounding message (for example, Type 0 defining whether to transmit the sounding signals during one or more specific symbol intervals and whether the specific frequencies are specified for sending the sounding signals or Type 1 defining whether specific frequency bands are allocated for the sounding signals according to a specified permutation pattern |
| Separability Type | Identifies whether 1) to occupy all subcarriers in an assigned band or 2) whether to occupy decimated subcarriers |
| Decimation Value | If the separability type specifies decimation, this field specifies the decimation value, D, such that every Dth sub-carrier within the sounding allocation is to be used for sounding |
| Allocation Mode | Specifies the mode of allocation such as, for example, whether the mode is a 1) normal mode or 2) a band adaptive modulation and coding (band AMC) mode, such as described in the IEEE 802.16 standard |
| Starting Frequency Band | The starting frequency band for which the client station should use in sounding |
| Number of Frequency Bands | The number of contiguous frequency bands after the starting frequency band that the client station should use in sounding |

TABLE 1-continued

| Field | Notes |
| --- | --- |
| Number of Sounding Symbols | This field specifies the total number of symbols allocated for sounding (for example, from 1 to 8) |
| Sounding symbol index | This field specifies which of the sounding symbols of the allocated sounding symbols the CS is to use for transmitting the sounding signal |

In addition to the items listed in Table 1, the exemplary message for the BTS 110a to request a CS to transmit a sounding signal may include additional items. For example, the message format may be in accordance with the up link (UL) sounding command IE format specified in section 8.4.6.2.7.1 of the IEEE 802.16 standard. It should be additionally noted that the exemplary message format of Table 1 is for example only and provided for explanatory purposes.

In an embodiment employing a sounding signal request message in accordance with the format of Table 1, the sounding type may be restricted to type 0 (also referred to herein as Type A). In the present embodiment, the type 0 sounding type defines that the exemplary sounding request message specifies one or more specific symbol intervals and the specific frequencies for the CS to use in transmitting the sounding signal. The request message may specify the sounding symbols using, for example, the number of sounding symbols field and sounding symbol index field included in Table 1.

The frequency bands that the CS uses for the sounding signal may be dependent on the type of allocation mode to be used (for example, normal or Band AMC) and specified in the sounding request message using fields, such as, for example, the starting frequency band field and the number of frequency bands field included in Table 1. For example, pursuant to the normal allocation mode, the frequencies over which the CS transmits the sounding signal may be specified by specifying a starting frequency block and a number of assigned frequency blocks using, for example, the Starting Frequency Band field and Number of Frequency Bands fields of Table 1. Or, for example, for Band AMC, the request message specifies a starting frequency band, a number of frequency bands, and a decimation value indicating that every x-th sub-carrier frequency in the frequency band is used by the CS for sounding. Further, as noted above, these sounding signals and requests for the same may be in accordance with the sounding signals used for beamforming as specified in the IEEE 802.16 standard. Additionally, in an embodiment, the sounding signal transmitted by the CS may be transmitted using a sequence, such as, for example, a Golay sequence, such that multiple CSes may transmit sounding signals simultaneously using the same sub-carriers, but with each CS using a different phase of the Golay sequence (i.e., a different circular shift). Then, upon receipt, the BTS 110a may multiply the received signal by the Golay sequence for the CS to recover a particular sounding signal transmitted by the CS.

Figure 6:
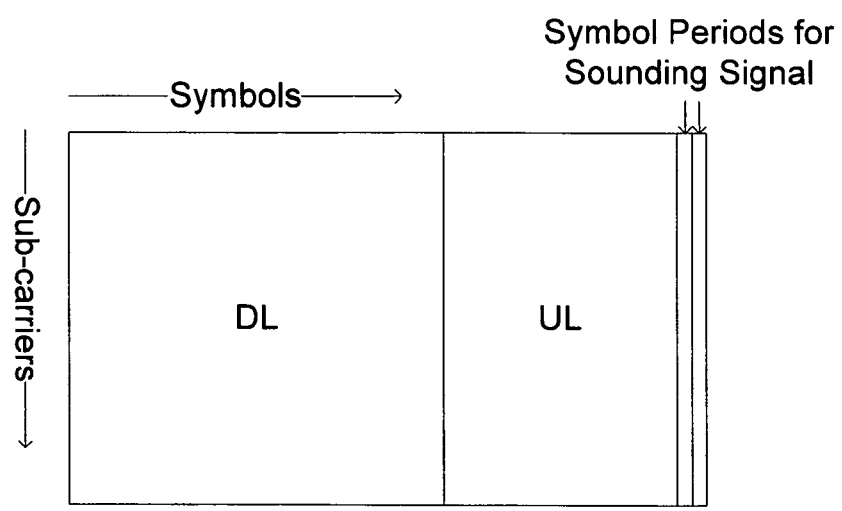
FIG. 6 illustrates an example of a simplified OFDMA frame.

FIG. 6 is a simplified OFDMA frame showing DL and UL data regions. Time is along a horizontal axis, and frequency is along a vertical axis. As shown in FIG. 6, two symbol periods are allocated for beamforming sounding signals.

The values selected for the exemplary fields in the sounding request may be determined by a system administrator based on, for example, the number of CSes communicating with the BTS 110a, or, for example, determined by the BTS 110a dynamically.

Once the sounding signal is received by the BTS 110a, the BTS 110a may analyze the received sounding signal to determine whether any power, time, or frequency adjustments should be made by the client station (CS). If so, the BTS 110a may transmit a message to the CS instructing the CS to make the appropriate adjustments. The following provides a description of one method that may be used by the BTS 110a for analyzing a sounding signal received by the CS to determine whether any timing adjustments should be made by the CS.

The process begins with the BTS 110a receiving a one or more symbols transmitted by the client station at one or more subcarrier frequencies. As noted above, in an embodiment, the sounding signal request message transmitted by the BTS 110a to the CS may specify the sub-carriers and symbol period over which the CS is to transmit the sounding signals. Each transmission by the CS over a particular sub-carrier frequency and during a particular symbol period is referred to herein as a sounding symbol.

The received sounding symbol (in frequency domain) $Y_k$ for subcarrier k is first multiplied by the corresponding Golay sequence $G_k$ to remove the Golay sequence. The resulting vector is fed into an IFFT block, the output of which yields the channel impulse response $h_i[n]$ for receive chain i of the desired user. Here the index n goes from −/2 to L/2−1 where L equals SndIFFTSize/D (for decimation with D) or SndIF-FTSize/P (for cyclic shift with P). Note that SndIFFTSize is the size of the IFFT in the sounding IFFT block, which is not necessarily equal to the FFT size. For example, for a 10 MHz system, the FFT size can be 1024, but the SndIFFTSize can be 256 if sounding allocations use quarter bandwidth.

Given the channel impulse response $h_i[n]$, the first step is to compute the power delay profile P[n] via, for example, equation 1.

$$P[n] = \sum_{i=1}^{M} |h_i[n]|^2 \quad \text{(Eq. 1)}$$

In Equation 1, M denotes the number of receive antennas.

From the channel power delay profile P[n], the next step is to run a channel cleaning algorithm to obtain P'[n]. As used herein, a channel cleaning algorithm refers to an algorithm that may be used to remove noise and/or interference from an input (e.g., P[n] in this example). This step may be used to prevent the noise/interference components in P[n] from skewing the timing estimate.

Given the modified power delay profile P'[n], the mean channel delay $T_m$, which can be simply the centroid of P'[n] as expressed in Equation 2.

$$T_m = \frac{\sum_{n} nP'[n]}{\sum_{n} P'[n]} \quad \text{(Eq. 2)}$$

After this mean channel delay $T_m$, is calculated, it may be compared against the desired mean channel delay.

Figure 7:
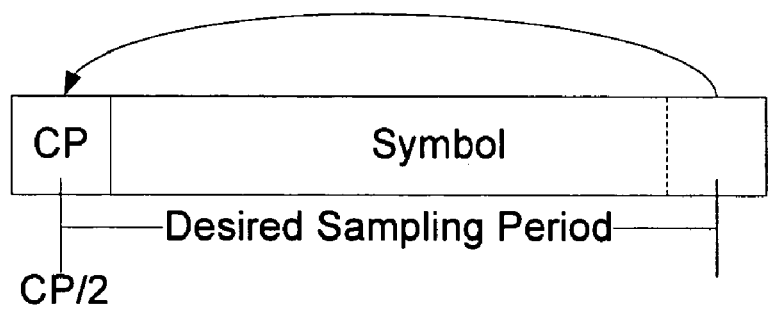
FIG. 7 illustrates an example of a sounding symbol.

FIG. 7 illustrates an example of a sounding symbol (prior to Golay encoding). As shown, the illustrated symbol includes a cyclic prefix (CP) followed by the symbol. When sampling symbols are transmitted in this manner, it is desired to sample the symbol over the period beginning halfway through the cyclic prefix (CP) and over a duration matching the symbol length. In the illustrated example, the desired timing adjustment is determined by comparing the computed $T_m$ to CP/2. The BTS 110a then determines the desired adjustment based on this comparison so as to adjust $T_m$ so that it matches CP/2. The BTS 110a then generates a ranging response (RNG-RSP) message such as discussed earlier that is transmitted to the CS to instruct the CS to adjust its timing accordingly.

The following provides an explanation of some exemplary channel cleaning algorithms that may be used for removing noise and/or interference from the channel power delay profile P[n].

Pursuant to a first channel cleaning algorithm, referred to herein as the max sample power channel cleaning algorithm, a detection threshold, $T_{det}$, is selected as X dB less than the maximum channel power delay profile (PDP) sample:

$$T_{det} = \max(P[n]) \cdot 10^{-X/10}$$

Figure 8:
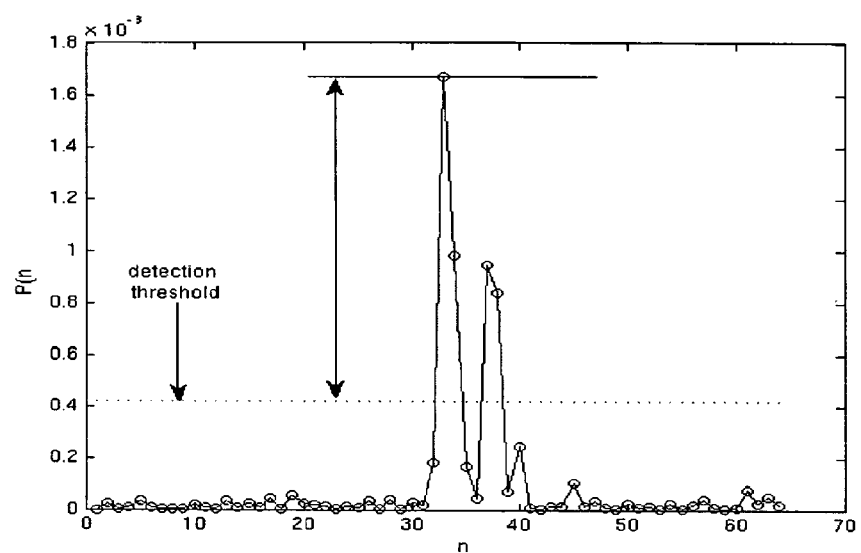
FIG. 8 illustrates a maximum sample power channel cleaning algorithm.

In computing the mean channel delay, $T_m$, only the values of P[n] greater than or equal to $T_{det}$ are included in the centroid computation (Eq. 2). FIG. 8 illustrates an example of this algorithm.

Figure 9:
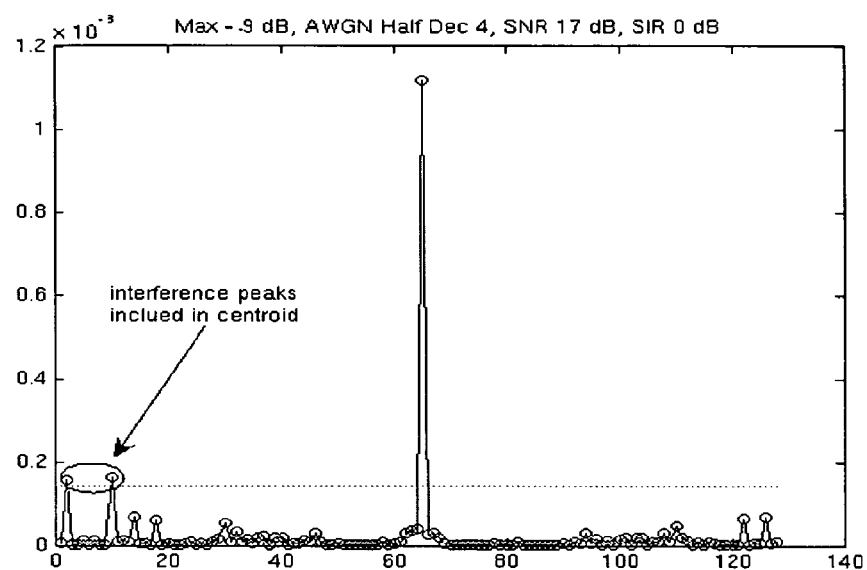
FIG. 9 illustrates an example of the maximum sample power channel cleaning algorithm at 10 MHz.

The performance of this algorithm is dependent on many factors such as signal-to-noise ratio (SNR), interference levels, channel type, and the choice of parameter X. If X is chosen to be too large, many interference peaks and/or noise samples may be included in the computation of the mean delay. If X is chosen to be too small however, weak channel taps of the desired user may be ignored and thus cause estimation error. FIG. 9 shows an example of a 10 MHz case with half band allocation using decimation with D=4. In FIG. 9, the SNR is 17 db and SIR is 0 dB and X is chosen as 9 dB. It is clear from the figure that X is large enough so that the two peaks due to intercell interference indicated in the graph will be included in the centroid computation and contribute to a timing error.

Figure 10:
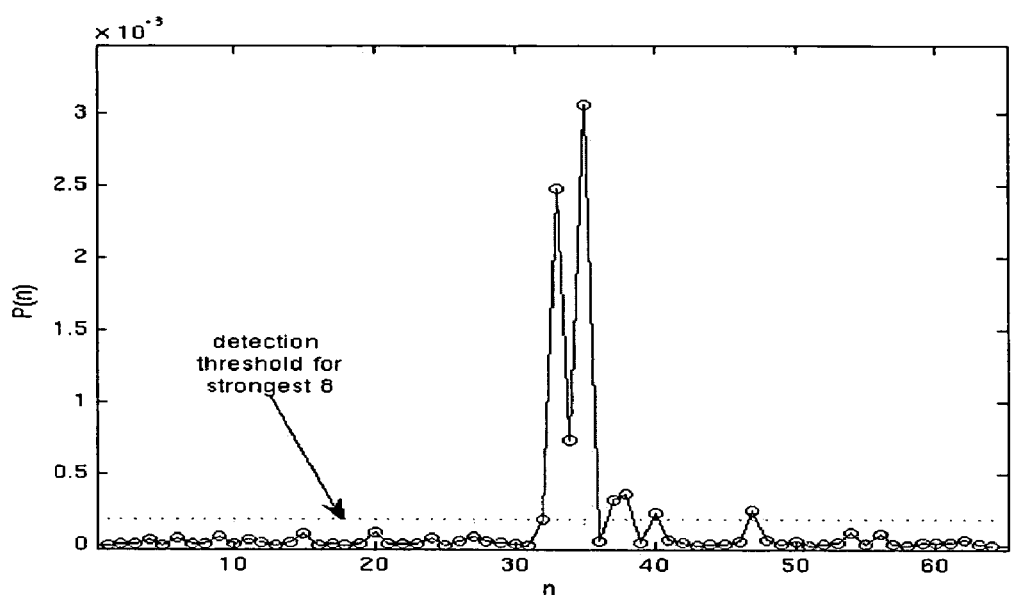
FIG. 10 illustrates a strongest N samples channel cleaning algorithm.

The following provides a description of another exemplary channel cleaning algorithm, which is referred to herein as the strongest N samples channel cleaning algorithm. Pursuant to this algorithm, only the strongest N samples of P[n] are used in computing the centroid (Eq. 2), and the rest are ignored. FIG. 10 illustrates an example of the algorithm for N=8.

The optimum number N to be chosen depends on factors such as channel type, interference level, separability type and SNR. For example in a relatively high SNR AWGN case, it is typically best to use a relatively small N, but for fading channels such as a typical urban area (TU) or a bad urban area (BU), N should roughly equal to the number of paths in the power delay profile depending on the interference level.

Figure 11:
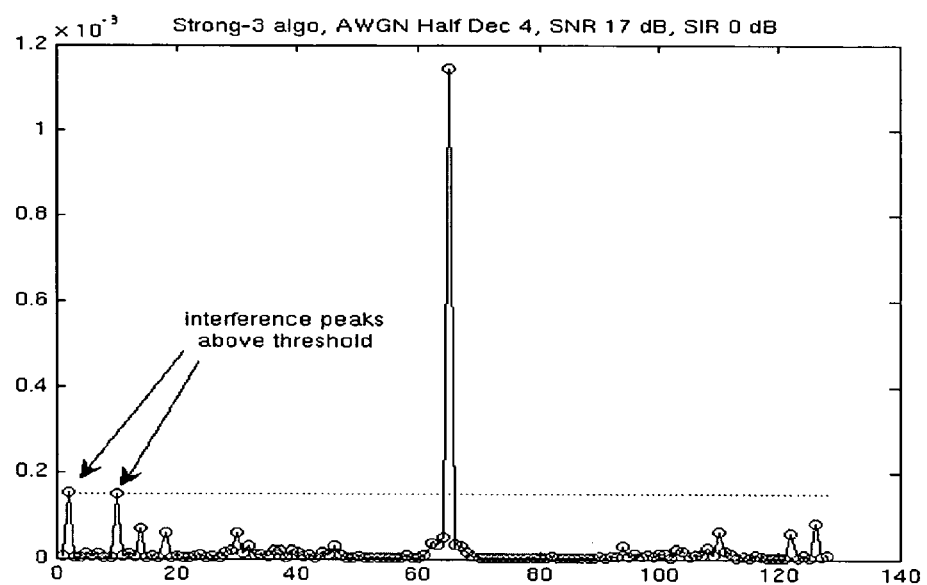
FIG. 11 illustrates the strongest N samples channel cleaning algorithm, with N equal to 3 and with decimation equal to 4.

FIG. 11 illustrates a potential problem of this algorithm for a 10 MHz example using half band allocation with decimation D=4. SNR is 17 dB and SIR is 0 dB, and N is taken as 3. It is clear that N is large enough so that two peaks due to intercell interference indicated in FIG. 11 will be used in mean delay computation and will contribute to the timing error.

Figure 12:
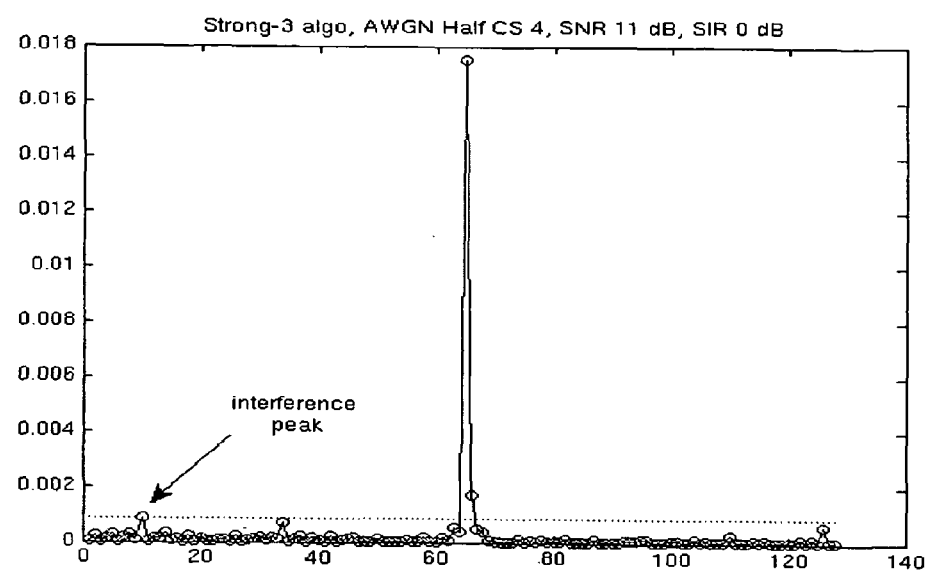
FIG. 12 illustrates the strongest N samples channel cleaning algorithm, with N equal to 3 and with a cyclic shift.

FIG. 12 illustrates another example similar to the previous example but using cyclic shift instead of decimation and SNR is 11 dB. In this example using the strongest three samples causes only 1 interference peak rather than 2 to be used in mean delay computation.

Figure 13:
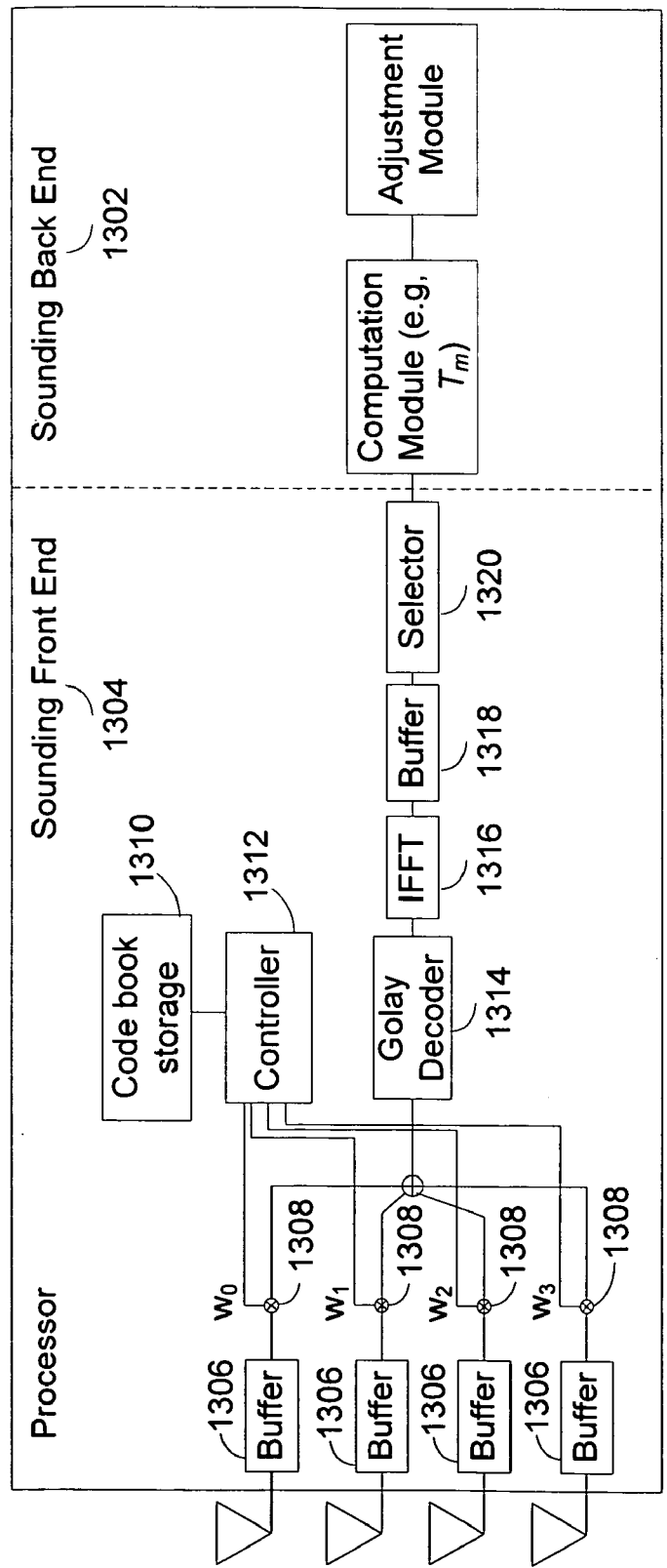
FIG. 13 is a simplified diagram provided to illustrate exemplary functional blocks that may be used to improve performance.

In embodiments in which the BTS 110a includes, for example, a multiple-element antenna array, the BTS 110a may use beamforming to help improve the PTF adjustments. FIG. 13 is a simplified diagram provided to illustrate exemplary functional blocks that may be used to improve performance.

In this example, the sounding back end 1302 may be identical to the processing discussed above, and the sounding front end 1304 the sole addition. In this example, the antennas signals over the symbol period for the sounding signal are stored in a buffer 1306. These antenna signals are then multiplied 1308 by beamforming coefficients from a stored codebook 1310, which can be stored in a memory device. This codebook 1310 may store, for example, multiple sets of beamforming coefficients. For exemplary purposes, in this example, the number of sets, N, will be assumed to be 4 and the number of antennas will be assumed to be 4, although in other examples, different numbers of antennas and sets may be used.

For each of the sets, a controller 1312 applies this set of beamforming coefficients against the stored antenna signal and the resulting outputs are combined. This functions as applying a particular beamforming pattern to the received signal. A Golay decoder 1314 can decode Golay sequence encoded data as applicable. An inverse fast Fourier Transform (IFFT) 1316 is then applied to the combined signal and the resulting IFFT result is stored in a buffer 1318 and can be used to generate an impulse response for this particular beamforming pattern. Similarly, an impulse response is generated for the received antenna signal and each of the other sets of beamforming coefficients stored in the codebook 1310. After each of the impulse responses are determined, the impulse response with the highest absolute value is selected by the selector 1320. This impulse response is then used in determining the PTF adjustments to be made. For example, in the above discussed example for determining timing adjustments, the selected impulse response is used as the input for computing the power delay profile, and so on.

In yet another modification, this sounding front end 1304 may be used for additional purposes. For example, this sounding front end 1304 may be used for ranging. In ranging, multiple CSes may simultaneously transmit a ranging signal. Using an omni-directional antenna pattern at the BTS 110*a* may result in collisions among the ranging signals transmitted by multiple CSes, resulting in corruption of a ranging measurement. However, if an appropriate beamforming pattern is used, these collisions may be reduced by using a beamforming pattern that provides relatively high gain for a ranging signal from one CS and rendering the signal from the other CSes to be relatively low in signal strength. Thus, in such an implementation, the sets of beamforming patterns from the codebook 1310 may be applied for each received signal during the ranging period, and the signal selected for the beamforming pattern that has the best performance.

Although the above enhancement was discussed with reference to a multiple-element antenna array, it should be understood that the above-discussed enhancement may be employed in BTSs including other types of one or more antennas in which beam forming may be used.

Various embodiments have been described above. Although described with reference to these specific embodiments, the descriptions are intended to be illustrative and are not intended to be limiting. Various modifications and applications may occur to those skilled in the art.

What is claimed is:

1. A method for correcting transmission parameters comprising:
   a base station wirelessly communicating with a client station;
   the base station transmitting to the client station a sounding command to instruct the client station to transmit a sounding signal;
   the base station receiving in an uplink the sounding signal from the client station;
   the base station determining channel characteristics based at least partly on the sounding signal;
   the base station determining one or more signal transmission correction parameters for at least one of timing adjustment, power adjustment, or frequency adjustment based at least partly on the determined channel characteristics;
   the base station transmitting in a downlink to the client station a message including the one or more correction parameters;
   the base station transmitting a second sounding command to the client station in order to perform a beamforming adjustment;
   the base station receiving in an uplink a second sounding signal from the client station; and
   the base station performing a beamforming adjustment for an antenna of the base station based at least partly on the second sounding signal.

2. The method of claim 1 wherein the downlink message is a ranging response message.

3. The method of claim 1, further comprising:
   the base station requesting the client station to transmit the sounding signal via a sounding command that identifies one or more client stations to transmit the sounding signal,
   wherein the sounding command specifies one or more characteristics of the sounding signal to be used by the one or more client stations.

4. The method of claim 3, wherein requesting the client station to transmit a sounding signal further comprises:
   requesting the client station to periodically repeat the sounding signal; and
   correspondingly receiving the repeated sounding signals, redetermining channel characteristics, redetermining one or more correction parameters, and retransmitting messages to the client station to correct transmission parameters.

5. The method of claim 1 wherein the sounding command complies with an uplink sounding command information element (IE).

6. The method of claim 1, further comprising transmitting an allocation of a sounding zone such that the client station can transmit the sounding signal without collisions.

7. An apparatus comprising:
   a transmitter configured to process signals for transmission to a client station over a wireless transmission medium;
   a receiver configured to receive at least a sounding signal from the client station over the wireless transmission medium; and
   a control circuit in communication with the transmitter and the receiver,
   wherein the control circuit is configured to:
      cause the transmitter to request the client station to transmit the sounding signal over a wireless transmission medium;
      determine channel characteristics associated with the sounding signal;
      determine one or more signal transmission correction parameters for at least one of timing adjustment, power adjustment, or frequency adjustment based at least partly on the determined channel characteristics;
      cause the transmitter to transmit a ranging response message including the one or more correction parameters;
      transmit via the transmitter a second sounding command to the client station in order to perform a beamforming adjustment;

receive via the receiver a second sounding signal from the client station; and perform a beamforming adjustment for an antenna of the base station based at least partly on the second sounding signal.

8. The apparatus of claim 7, further comprising an integrated circuit.

9. The apparatus of claim 7 wherein the apparatus is a base station.

10. The apparatus of claim 7 wherein:

the control circuit is further configured to cause the transmitter to request the client station to transmit the sounding signal via a sounding command that identifies one or more client stations to transmit the sounding signal, and the sounding command specifies one or more characteristics of the sounding signal to be used by the one or more client stations.

11. The apparatus of claim 7 wherein:

the control circuit is further configured to cause the transmitter to request the client station to transmit the sounding signal via a sounding command that identifies one or more client stations to transmit the sounding signal, and the sounding command specifies one or more characteristics of the sounding signal to be used by the one or more client stations.

12. The apparatus of claim 7 wherein the control circuit is further configured to:

cause the transmitter to request the client station to periodically repeat the sounding signal; and cause the receiver to correspondingly receive the repeated sounding signals, to redetermine channel characteristics, to redetermine one or more correction parameters, and to cause the transmitter to retransmit messages to the client station to correct transmission parameters.

13. The apparatus of claim 7 wherein the control circuit is further configured to transmit via the transmitter an allocation for a sounding zone.

* * * * *